(12) United States Patent
Comer

(10) Patent No.: US 7,840,969 B2
(45) Date of Patent: Nov. 23, 2010

(54) SYSTEM AND METHOD FOR MANAGEMENT OF JOBS IN A CLUSTER ENVIRONMENT

(75) Inventor: Michael Comer, Wexford, PA (US)

(73) Assignee: NetApp, Inc., Sunnyvale, CA (US)

( * ) Notice: Subject to any disclaimer, the term of this patent is extended or adjusted under 35 U.S.C. 154(b) by 984 days.

(21) Appl. No.: 11/414,696

(22) Filed: Apr. 28, 2006

(65) Prior Publication Data

US 2007/0256081 A1 Nov. 1, 2007

(51) Int. Cl.
| G06F 13/00 | (2006.01) |
| G06F 9/46 | (2006.01) |
| G06F 3/00 | (2006.01) |
| G06F 11/00 | (2006.01) |
| G06F 3/12 | (2006.01) |
| G06K 15/00 | (2006.01) |

(52) U.S. Cl. ............... 719/314; 718/100; 710/5; 710/6; 710/8; 714/2; 358/1.13; 358/1.14; 358/1.15; 358/1.18

(58) Field of Classification Search ............ 719/314, 719/316; 358/1.13–1.15, 1.18; 710/5–6; 714/2

See application file for complete search history.

(56) References Cited

U.S. PATENT DOCUMENTS

| 5,819,292 | A | | 10/1998 | Hitz et al. |
| 5,845,082 | A | * | 12/1998 | Murakami ............... 709/226 |
| 6,249,821 | B1 | * | 6/2001 | Agatone et al. ............ 719/316 |
| 6,384,933 | B1 | * | 5/2002 | McGinnis et al. ........ 358/1.18 |
| 6,604,148 | B1 | * | 8/2003 | Dennison ................... 709/245 |
| 6,788,429 | B1 | * | 9/2004 | Clough et al. ............ 358/1.15 |
| 7,099,027 | B1 | * | 8/2006 | Barry et al. .............. 358/1.15 |
| 2002/0116593 | A1 | | 8/2002 | Kazar et al. |
| 2003/0212709 | A1 | * | 11/2003 | De Schrijver ........... 707/104.1 |
| 2003/0223090 | A1 | * | 12/2003 | Seifi ........................ 358/1.15 |
| 2003/0234957 | A1 | * | 12/2003 | Ohara ...................... 358/1.15 |
| 2004/0139167 | A1 | | 7/2004 | Edsall et al. |
| 2005/0192332 | A1 | | 9/2005 | Barth et al. |
| 2005/0192932 | A1 | | 9/2005 | Kazar et al. |
| 2005/0246401 | A1 | | 11/2005 | Edwards et al. |
| 2005/0278383 | A1 | | 12/2005 | Kazar et al. |

OTHER PUBLICATIONS

Notification of Transmittal of the International Search Report and the Written Opinion of Internatioanl Searching Authority, or the Declaration. Feb. 2, 2007.

"Using the ISIS resource manager for distributed, fault-tolerant computing." Clark T. A. et al. Proceeding of the Twenty-Sixth Hawaii International Conference on System Sciences (CAT. No. 93TH0501-7) IEEE Los Alamitos, CA, USA, 1993, pp. 257-265 vol. 1, XP010640439, ISBN: 0-8186-3230-5.

* cited by examiner

*Primary Examiner*—Andy Ho
*Assistant Examiner*—Phuong N Hoang
(74) *Attorney, Agent, or Firm*—Cesari and McKenna, LLP

(57) ABSTRACT

A system and method for management of jobs in the cluster environment is provided. Each node a cluster executes a job manager that interfaces with a replicated database to enable cluster wide management of jobs within the cluster. Jobs are queued in the replicated database and retrieved by a job manager for execution. Each job manager ensures that jobs are processed through completion or, failing that, are re-queued on another storage system for execution.

22 Claims, 14 Drawing Sheets

| | |
|---|---|
| NAME | *1305* |
| IDENTIFIER | *1310* |
| AFFINITY | *1315* |
| OWNER | *1320* |
| PRIORITY | *1325* |
| RUN STATE | *1330* |
| JOBS WAITING ON | *1335* |
| SCHEDULE | *1340* |
| QUEUE TIME | *1345* |
| START TIME | *1350* |
| RESCHEDULE INTERVAL | *1355* |
| DROP DEAD TIME | *1360* |
| REQUEUED FLAG | *1365* |
| JOB TYPE | *1370* |
| ⋮ | *1375* |

FIG. 13

SYSTEM AND METHOD FOR MANAGEMENT OF JOBS IN A CLUSTER ENVIRONMENT

FIELD OF THE INVENTION

The present invention relates to clustered computer environments and, more particularly, to the management of jobs in a clustered computer environment.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system cluster configured to service many clients. Each storage system may be configured to service one or more volumes, wherein each volume stores one or more data containers. In certain storage system clusters, data container content may be striped across a plurality of volumes configured as a striped volume set (SVS), where each volume is serviced by a different storage system, thereby distributing the load for the single data container among a plurality of storage systems. A cluster environment for data container striping is described in U.S. Patent Publication No. 2005-0192932, entitled STORAGE SYSTEM ARCHITECTURE FOR STRIPING DATA CONTAINER CONTENT ACROSS VOLUMES OF A CLUSTER, by Michael Kazar, et al., now issued as U.S. Pat. No. 7,698,289 on Apr. 13, 2010.

Many of the administrative tasks that are performed in order to manage a storage system cluster involve complex and/or potentially long running operations. Certain tasks (jobs) may be required to run on a particular storage system within the cluster, while others may run on any storage system within the cluster. A job may comprise of a plurality of processes and/or threads operating in an organized fashion to complete the task. A noted disadvantage in conventional clustered storage systems is that an administrative command that initiates a job may need to be executed on the particular storage system on which the job is to be performed. This complicates cluster management by requiring a storage system cluster administrator to log into each of the storage systems to perform certain jobs.

A noted requirement for proper management, however, is that once a job has begun, the job must run to completion even in the event of a storage system failure. Additionally, if the job cannot run to completion, then the job must make a "clean" exit by, for example, deleting any temporary files created. In typical storage system clusters, these requirements have necessitated manual intervention on behalf of system administrators, thereby reducing system robustness for mission-critical clustered environments. For example, should a job be initiated on a particular storage system, which then suffered a failure prior to the completion of the job, an administrator would need to identify that the job did not complete and manually re-initialize the job on another storage system.

SUMMARY OF THE INVENTION

The present invention overcomes the disadvantages of the prior art by providing a system and method for management of jobs in a storage system cluster environment. According to the invention, a job manager (JM) executes on each storage system within the clustered environment to provide a framework for scheduling and/or executing jobs within the cluster. The JM ensures that jobs execute through to completion and, in the event of a failure of a storage system, re-initiates the jobs on either that storage system (once it has recovered) or another storage system within the storage cluster. To that end, the JM interfaces with a replicated data base (RDB) containing one or more queues for tracking the various jobs and their affinities to particular storage systems, i.e. whether they must execute on that storage system.

In response to a user issuing a command to perform an administrative operation, a configuration object is created and passed to the JM. The configuration object illustratively contains parameters and/or options specified by the user when issuing the command. The JM uses this object to create a job object. The job object illustratively contains data situations and/or executable instructions needed to perform a job. The JM then loads the created job object onto a queue of the RDB. Each JM within the storage system cluster monitors the queue for newly loaded jobs. Should a job contain an affinity for a particular storage system, the JM of that particular storage system retrieves the job from the queue of the RDB and processes the job. If the job contains no particular storage system affinity, than any JM within the cluster that has available processing bandwidth may retrieve and process the job.

To ensure that jobs execute to completion, one of the JMs within the cluster is designated a master job manager and monitors the status of the storage systems in the cluster. Upon detecting a failure of a storage system, the master job manager waits for a predefined timeout period to elapse. If the timeout period elapses without the failed storage system recovering, the master job manager marks the job as unclaimed so that one of the other JMs within the cluster may claim the job in accordance with its normal job acquisition routine and process the job to completion. Only those jobs having a cluster affinity may be recovered by a second JM within the cluster.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 13 is a schematic block diagram of an exemplary state data structure in accordance with an embodiment of the present invention;

DETAILED DESCRIPTION OF AN ILLUSTRATIVE EMBODIMENT

A. Cluster Environment

Figure 1:
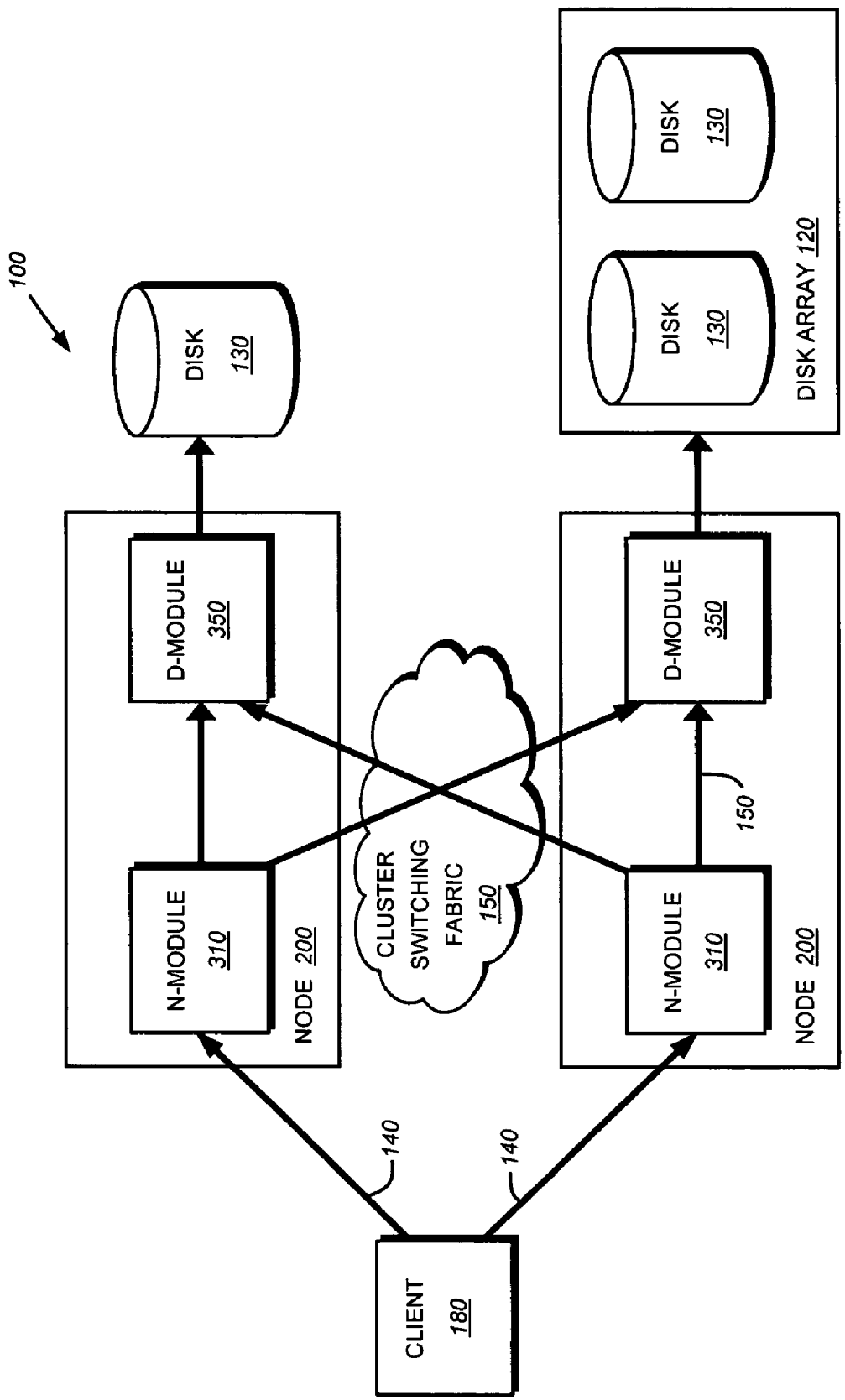
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al., issued Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-module and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
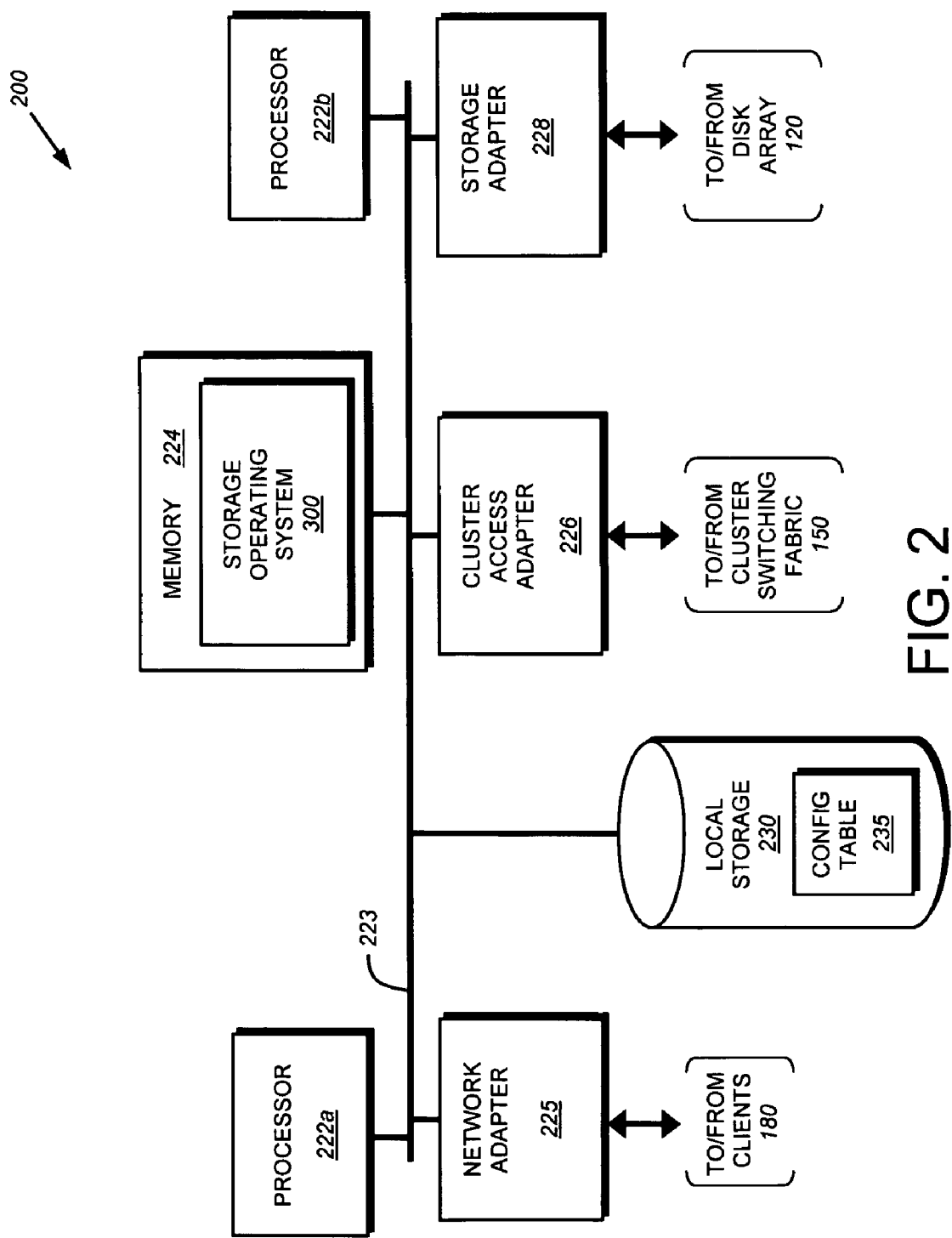
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software programs, i.e., specified sets of ordered operations, and data structures associated with the present invention. The processor and adapters may, in turn, comprise processing elements and/or logic circuitry configured to execute the programs and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
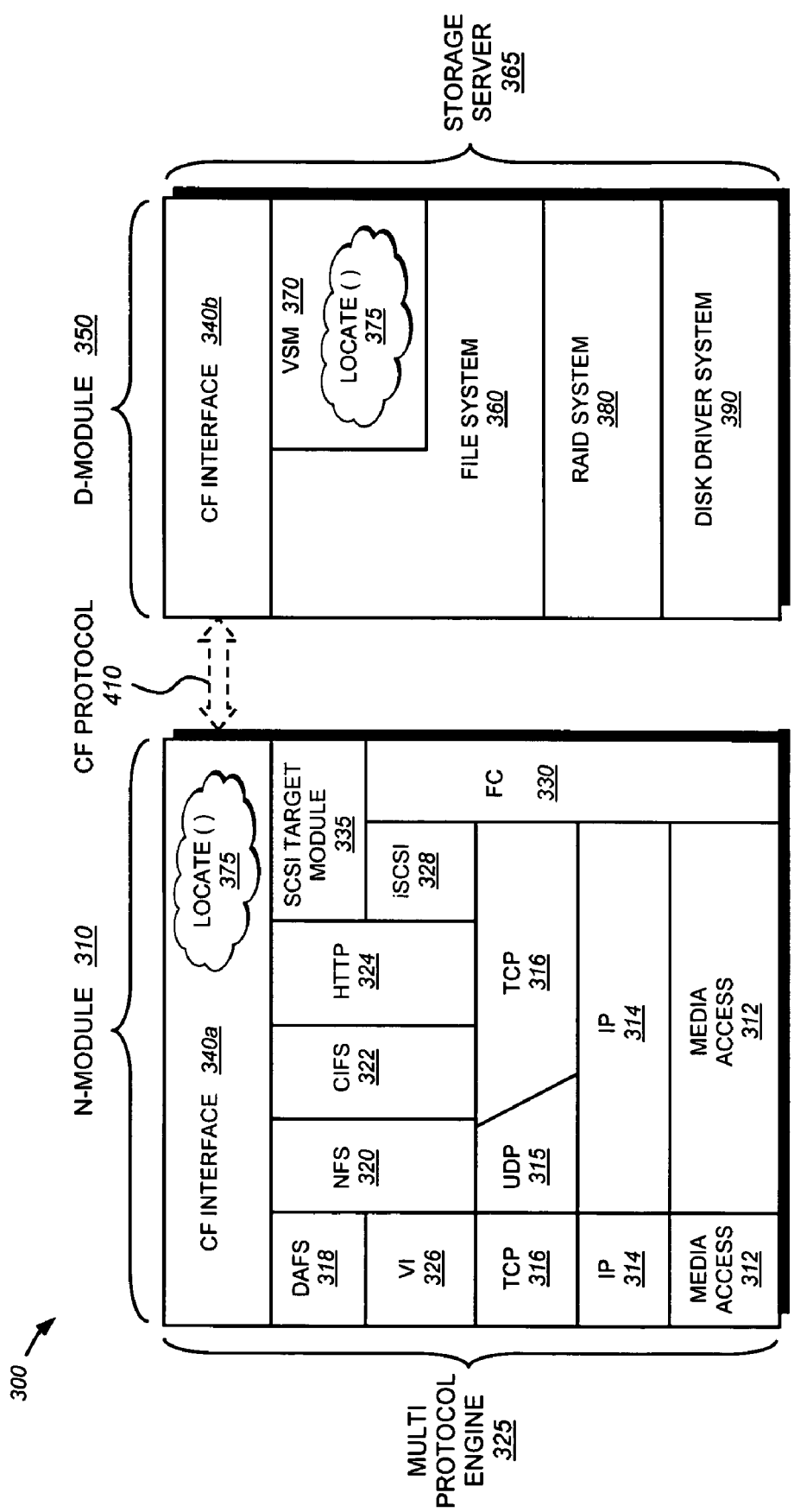
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS). In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a, b adapted to implement intra-cluster communication among the modules, including D-module-to-D-module communication for data container striping operations.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Illustratively, the N-module 310 and D-module 350 are implemented as separately-scheduled processes of storage operating system 300; however, in an alternate embodiment, the modules may be implemented as pieces of code within a single operating system process. As used herein, a process refers to an instance of a program being executed by, e.g., processor 222, and a thread is an instance of a sequence of the process's program code. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
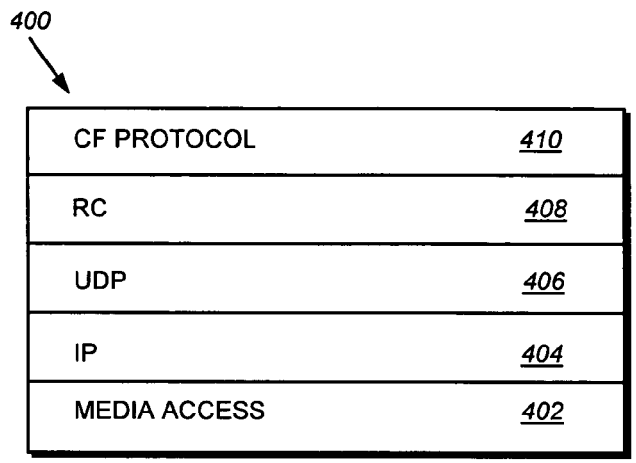
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
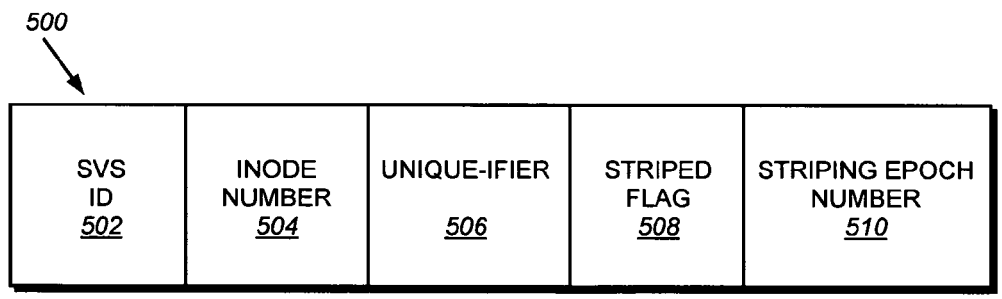
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
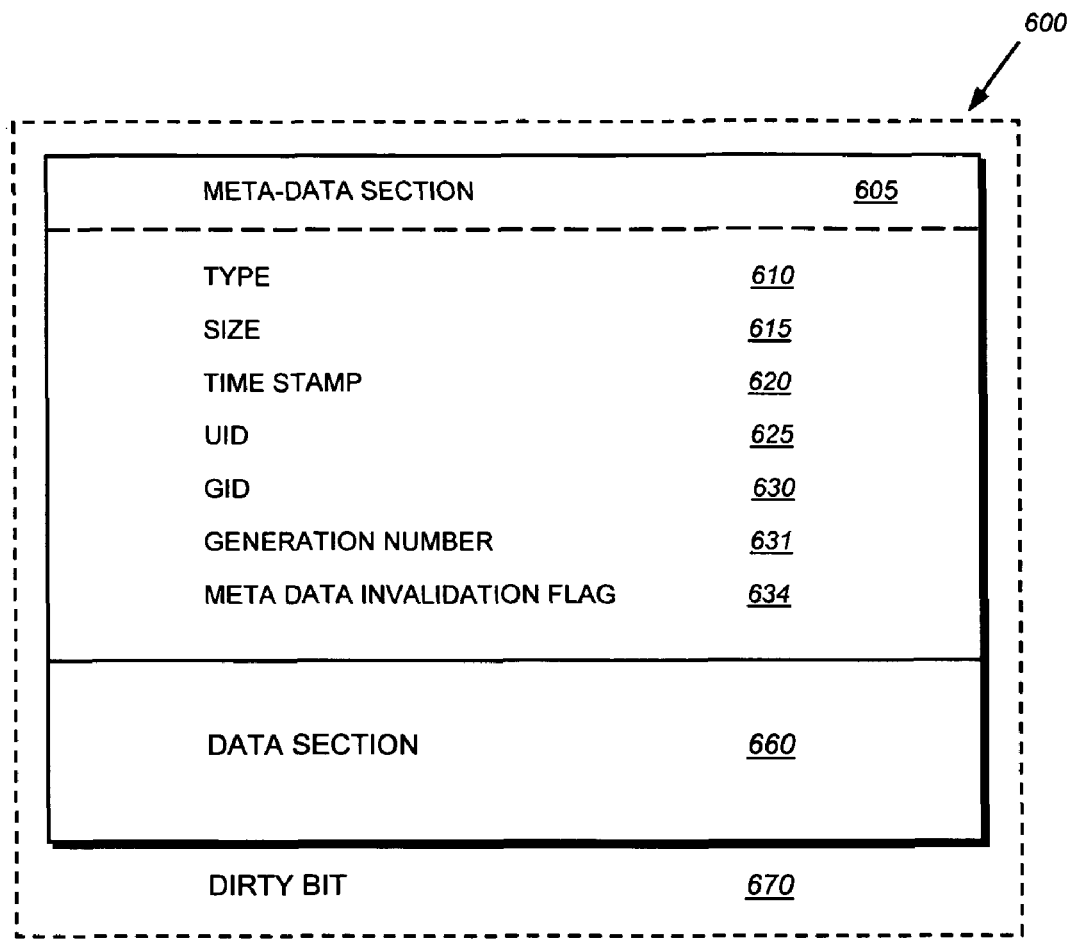
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631, and a meta-data invalidation flag field 634. As described further herein, meta-data invalidation flag field 634 is used to indicate whether meta-data in the inode is usable or whether it should be re-acquired from the MDV. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
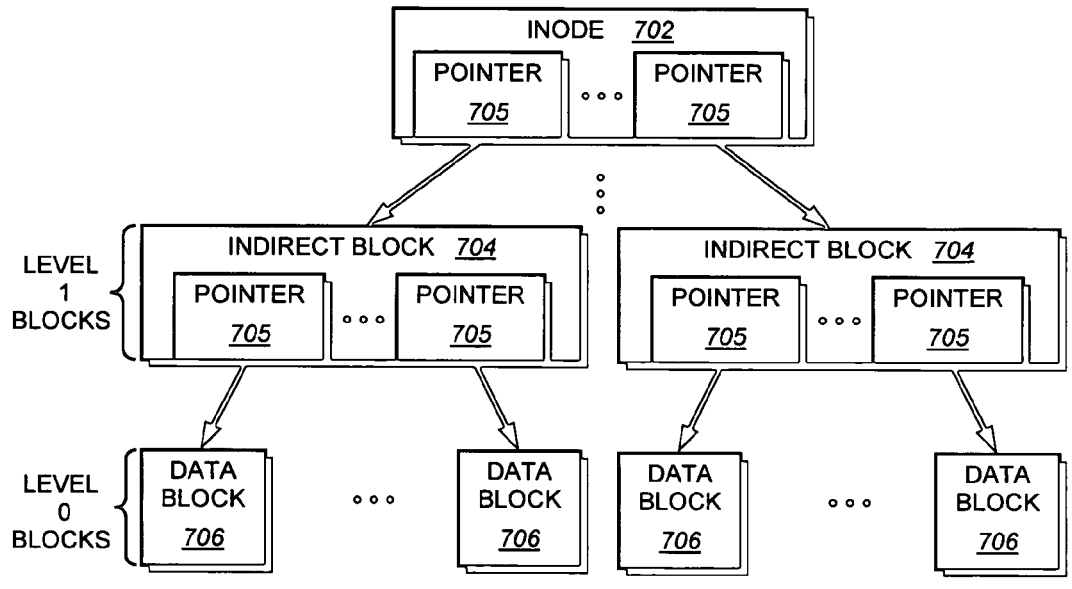
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. Pat. No. 7,409,494 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
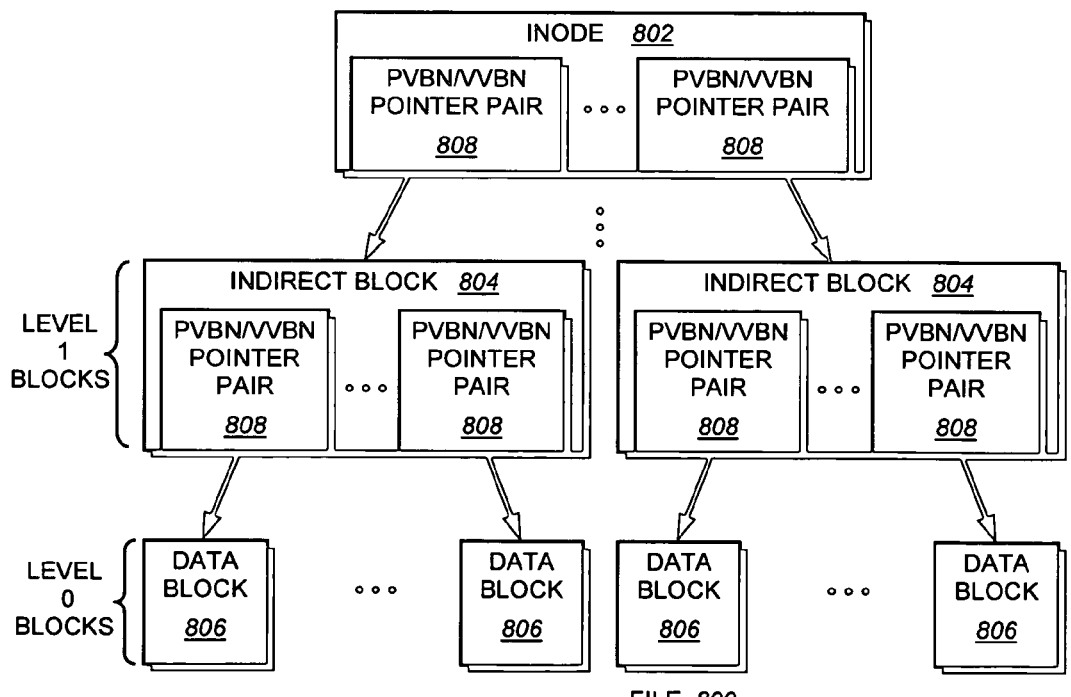
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
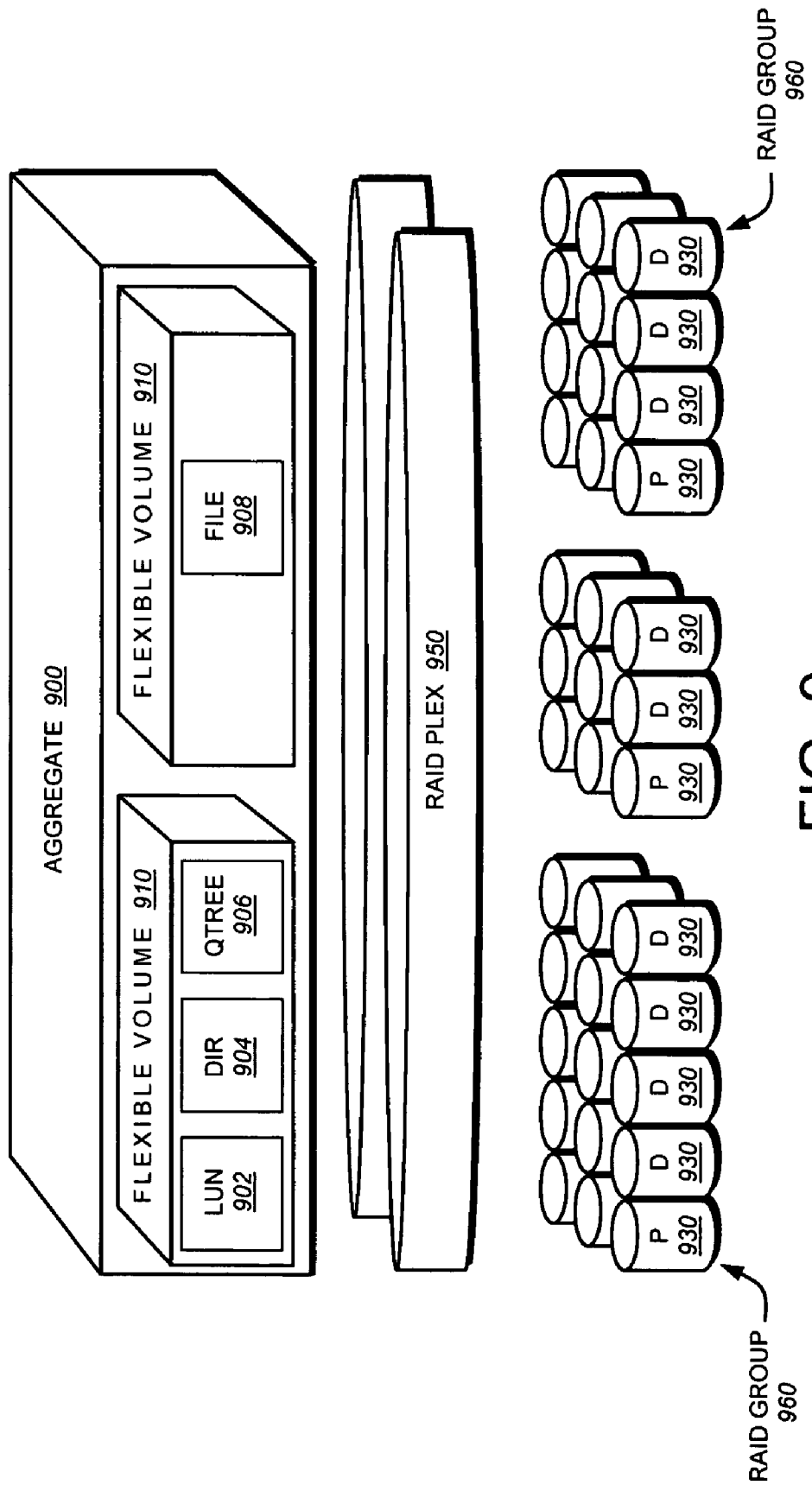
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
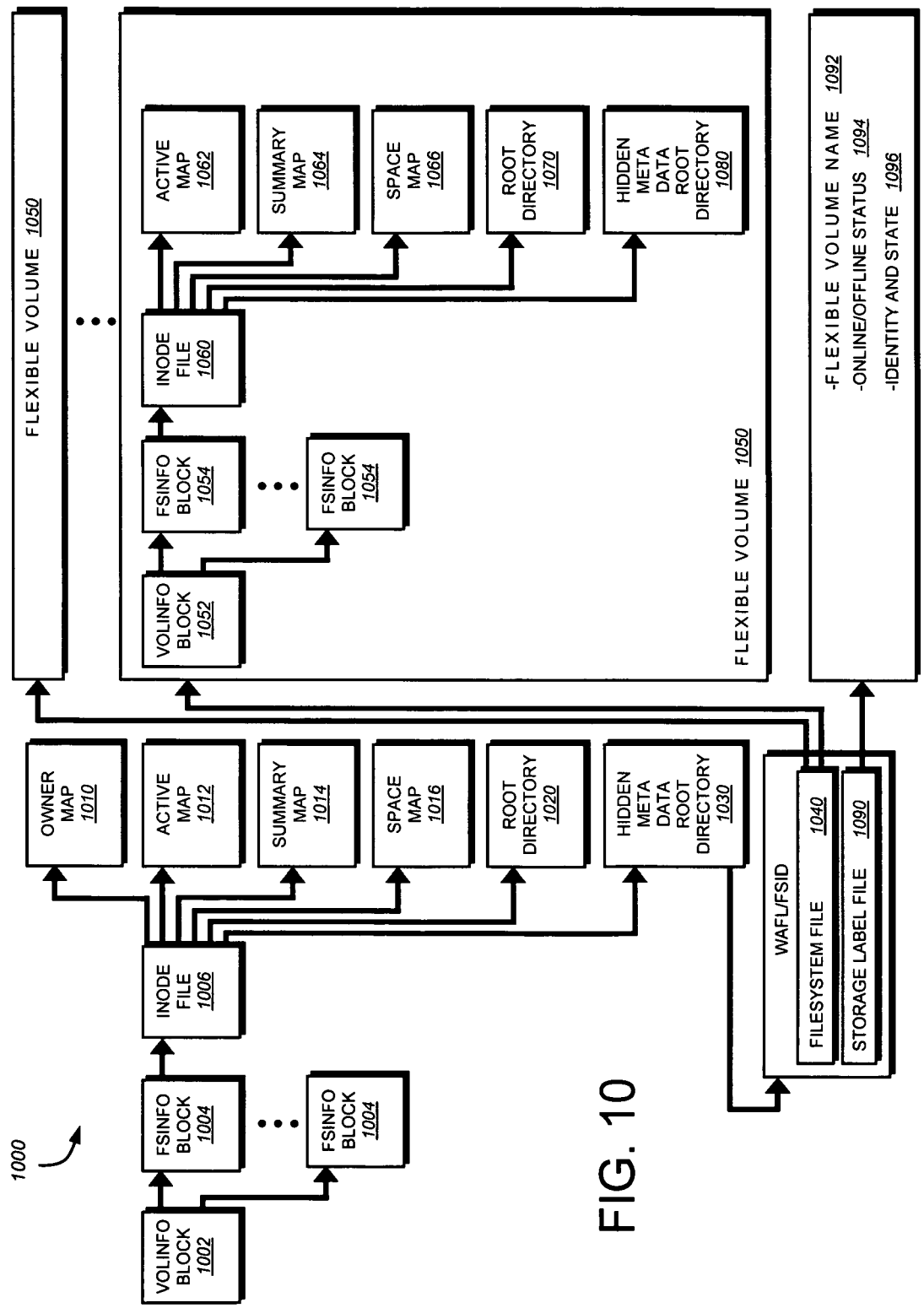
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. Management Processes

The present invention overcomes the disadvantages of the prior art by providing a system and method for management of jobs in a storage system cluster environment. According to the invention, a job manager (JM) executes on each storage system within the clustered environment to provide a framework for scheduling and/or executing jobs within the cluster. The JM ensures that jobs execute through to completion and, in the event of a failure of a storage system, re-initiates the jobs on either that storage system (once it has recovered) or another storage system within the storage cluster. To that end, the JM interfaces with a replicated data base (RDB) containing one or more queues for tracking the various jobs and their affinities to particular storage systems, i.e. whether they must execute on that storage systems.

In response to a user issuing a command to perform an administrative operation, a configuration object is created and passed to the JM. The configuration object illustratively contains parameters and/or options specified by the user when issuing the command. The JM uses this object to create a job object. The job object illustratively contains data situations and/or executable instructions needed to perform a job. The JM then loads the created job object onto a queue of the RDB. Each JM within the storage system cluster monitors the queue for newly loaded jobs. Should a job contain an affinity for a particular storage system, i.e., the job must execute on that storage system, the JM of that particular storage system retrieves the job from the queue of the RDB and processes the job. If the job contains no particular storage system affinity, than any JM within the cluster that has available processing bandwidth may retrieve and process the job.

To ensure that jobs execute to completion, one of the JMs within the cluster is designated a master job manager and monitors the status of the storage systems in the cluster. The master job manager may be selected using any arbitrary technique including, e.g., using the storage system with the lowest serial number or network address, the least utilized storage system, round robin, etc. Upon detecting a failure of a storage system, the master job manager waits for a predefined timeout period to elapse. If the timeout period elapses without the failed storage system recovering, the master job manager marks the job as unclaimed so that one of the other JMs within the cluster may claim the job in accordance with its normal job acquisition routine and process the job to completion. Only those jobs having a cluster affinity may be recovered by a second JM within the cluster.

Figure 11:
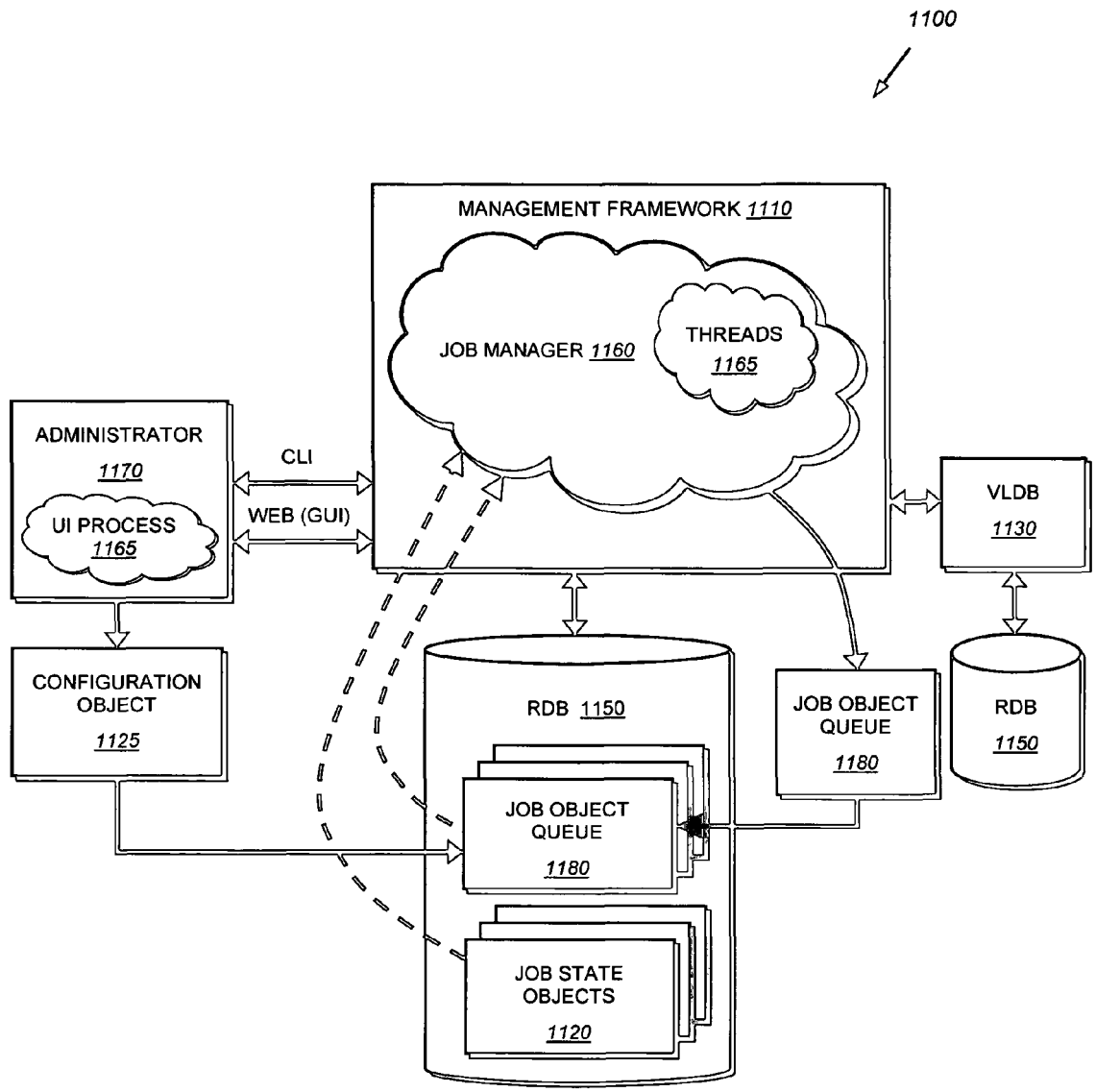
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. The management processes include a management framework process 1110 and a volume location database (VLDB) process 1130, each utilizing a data replication service (RDB 1150) linked as a library. The management framework 1110 provides a user interface (UI) to an administrator 1170 interface via a command line interface (CLI) and/or a web-based graphical user interface (GUI). The management framework is illustratively based on an element manager that provides the entity to which users/system administrators interact with a node 200 in order to manage the cluster 100.

The VLDB 1130 is a database process that tracks the locations of various storage components (e.g., flexible volumes, aggregates, etc.) within the cluster 100 to thereby facilitate routing of requests throughout the cluster. In the illustrative embodiment, the N-module 310 of each node accesses a configuration table 235 that maps the SVS ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster.

The management framework 1110 includes a job manager (JM) 1160 which is illustratively a multi-threaded process that provides an infrastructure and mechanism for scheduling the execution of administrative tasks embodied as jobs. The JM 1160 includes a plurality of threads 1165, each of which, in the illustrative embodiment, is associated with a priority level, e.g., high, medium and/or low priority. Illustratively, jobs having a particular priority may execute using any thread having that priority or a lower priority. Thus, for example, a low priority job may only executed on a low priority thread, whereas a high priority job may execute on a thread having a low, medium and/or high priority.

In accordance with the illustrative embodiment, a UI process 1175 of the administrator computer 1170 creates a configuration object 1125 in response to an administration operation command executed by a user. The configuration object 1120 is utilized to create a job object 1200 associated with a particular job. The created job object 1200 is then queued in a Job Object (J.O.) queue 1180 that persistently stores the job objects 1200 in a cluster-wide arrangement on the RDB 1150. Likewise each J.O. queue is configured to store one or more job objects loaded by one or more JMs. By persistently storing job objects 1200 and queues 1180, each JM 1160 within a cluster may identify jobs that are to be executed regardless of which JM 1160 initially loaded the job object 1200.

The management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. When a job object 1200 is loaded onto a queue 1180, the RDB alerts each JM 1160 so that an appropriate JM may take appropriate action.

Figure 12:
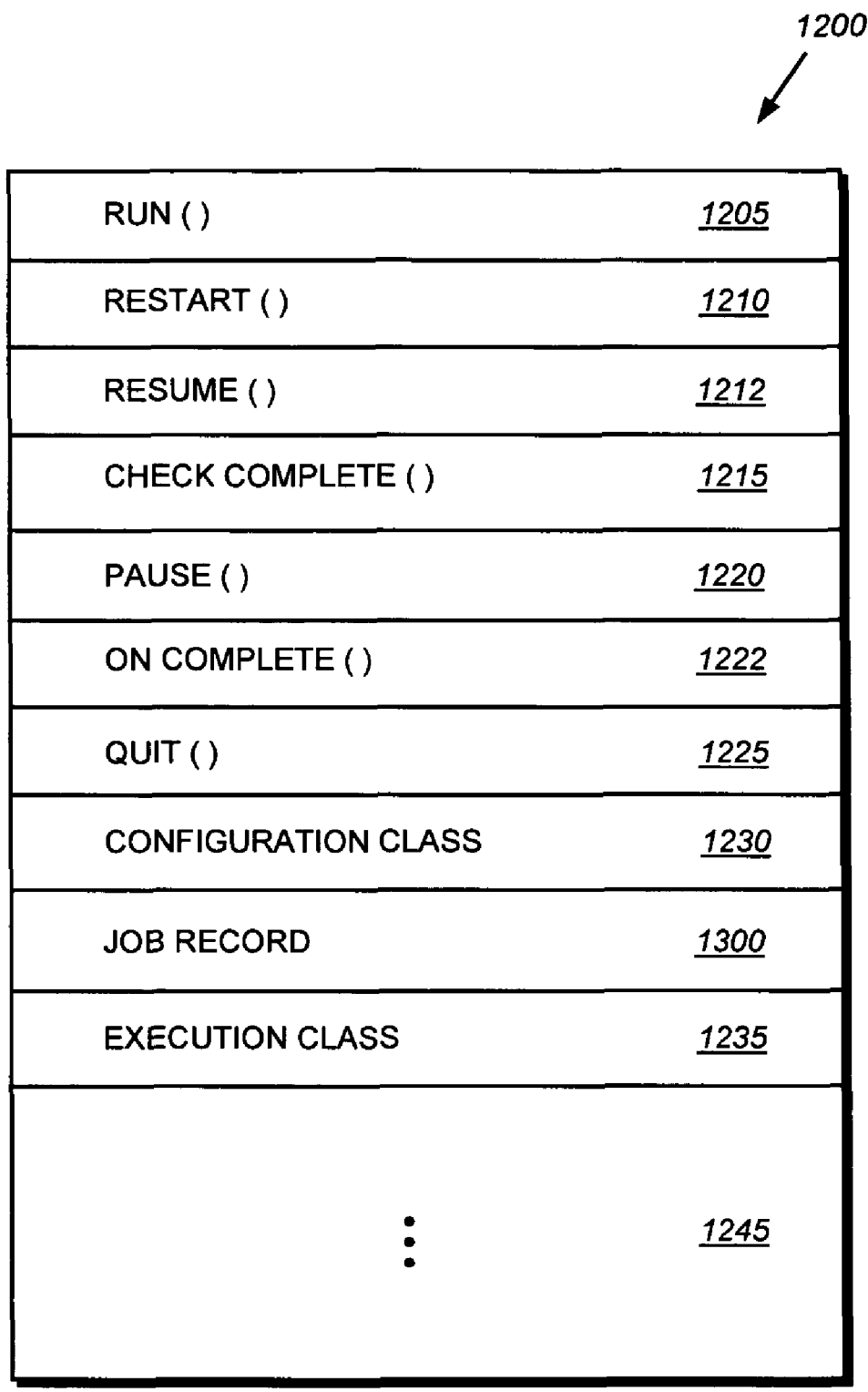
FIG. 12 is a schematic block diagram of an exemplary job object data structure in accordance with an embodiment of the present invention.

FIG. 12 is a schematic block diagram of an exemplary job object 1200 in accordance with an embodiment of the present invention. Illustratively, jobs are embodied using an object-oriented paradigm wherein each job object 1200 contains necessary data structures and/or executable instructions for performing the associated job. Illustratively, a job object 1200 includes a number of execution function entry points, including a Run( ) function 1205, a Restart( ) function 1210, a Resume( ) function 1212, a CheckComplete( ) function 1215, a Pause( ) function 1220 and a Stop( ) function 1225. Additionally, the job object data structure 1200 may include one or more data classes associated therewith including, for example, a configuration class 1230, a job record data structure 1300, an execution class 1235 and, in alternate embodiments additional classes and/or execution functions 1245.

The Run( ) function 1205 provides an initial entry point for the initialization and execution of the job. The JM 1160 calls the Run( ) function 1205 when first initializing the job associated with the job object 1200. Thus, the Run( ) function 1205 initiates the processing of the job by examining the information contained within the configuration class 1230 to determine the parameters of the job to be performed. Upon completion of the job, the Run( ) function returns a value, described further below, identifying the completion state of the job. The Restart( ) function 1210 is invoked by the JM to restart processing of a job after, a failure, e.g., a JM crash. The Resume( ) function 1212 is utilized to continue processing a paused job. The CheckComplete( ) function 1215 provides an entry point for the JM to check the completion status of the job. Illustratively, the CheckComplete( ) function 1215 returns a set of state information, which may illustratively be stored within the job record data structure 1300. The OnComplete( ) function 1222 is invoked to continue processing after waiting for another job to complete. Similarly, the Pause( ) and Quit( ) functions 1220, 1225 enable the JM to pause and/or stop the execution of the job.

The configuration class field 1230 stores necessary configuration information for the particular job. Specifically, the configuration class 1230 is unique for each particular type of job to be executed and enables the JM to create the appropriate job object 1200. As described further below, when a command is executed to initialize a job, the configuration class 1230 is created and queued for the JM to configure an appropriate job object 1200. The job record data structure

1300, contains a set of state information relating to the job. The execution class field 1235 contains job specific execution data structures for the job.

FIG. 13 is a schematic block diagram of an exemplary job record data structure 1300 in accordance with an embodiment of the present invention. Illustratively, the job record data structure 1300 is utilized within the job object data structure 1200 for tracking various in progress state information related to the job. The job record data structure 1300 illustratively includes a name field 1305, an identifier field 1310, an affinity field 1315, an owner field 1320, a priority field 1325, a run state field 1330, a list of jobs waiting on field 1335, a schedule field 1340, a queue time field 1345, a start time field 1350, a reschedule interval field 1355, a drop dead time field 1360, a re-queued flag field 1365, a job type field 1370 and in alternate embodiments, additional fields 1375. In alternate embodiments, additional, differing and/or fewer fields may be utilized.

The name field 1305 contains an alphanumeric name of the job associated with a particular job object 1200. The identifier field 1310 contains a numeric identifier associated with the particular job. The affinity field 1315 identifies whether the job contains an affinity for a particular storage system and or if the job may be executed on any storage system within the cluster, i.e. a cluster wide affinity. In the illustrative embodiment, a job may contain an affinity for an identified storage system, i.e., the job must execute on that storage system because of e.g., specific hardware that is only available on the identified storage system. The priority field 1325 identifies the priority level for the job. Illustratively, each job may be associated with a high, medium and/or low priority. The priority level determines which threads of a JM may be utilized in processing the job. In accordance with the illustrative embodiment, jobs may only be processed by a thread within a JM having a priority level the same as or lower than the priority level associated with the job. For example, a job having a medium priority may be executed by a medium and/or low level priority thread but may not be executed by a high priority thread. However, it should be noted that in alternate embodiments, differing thread prioritization schemes may be utilized without departing from the spirit or scope of the present invention.

The jobs waiting on field 1335 identifies any jobs that the current job is waiting on for completion before execution. For example, a job may be required to wait for the completion of a previously invoked job before performing some task. In such a case, the identifier of those job(s) that the current job is waiting for is stored within the jobs waiting on field 1335. The JM 1160 may examine this field 1335 to set appropriate alerts to invoke the OnComplete( ) function 1222 once the jobs have completed. The schedule field 1340 identifies a date/time that execution of the job should begin execution. The queue time field 1345 identifies the time at which the job was initially queued into the RDB. The start time field 1350 identifies the time at which execution of the job was initiated. The reschedule interval field 1355 contains a value identifying the frequency at which the job should be rescheduled. The reschedule interval 1355 is utilized when a job desires to be rescheduled outside of the normal schedule 1340. For example, if a job is to be run daily but experiences a problem, the job's reschedule interval 1355 may indicate that the job should be rescheduled in, e.g., 5 minutes and not wait until the next day's regularly scheduled time. The drop dead time field 1360 identifies a drop dead time for execution of the job. That is, the job must be executed by the time identified within the drop dead time field 1360.

The re-queued flag field 1365 illustratively contains a Boolean value that identifies whether the particular job object 1200 has been re-queued. Re-queuing may occur when, for example, the job is initiated by a particular JM but is halted for some reason, such as the failure of the JM initiating the job. In such a case, the master job manager, described further below, may re-queue the job for execution by another storage system. In such cases, the new JM 1160 invokes the job using the Restart( ) function 1210 instead of the Run( ) function 1205. The job type field 1370 identifies the type of job associated with the job object 1200.

G. Job Management

Figure 14:
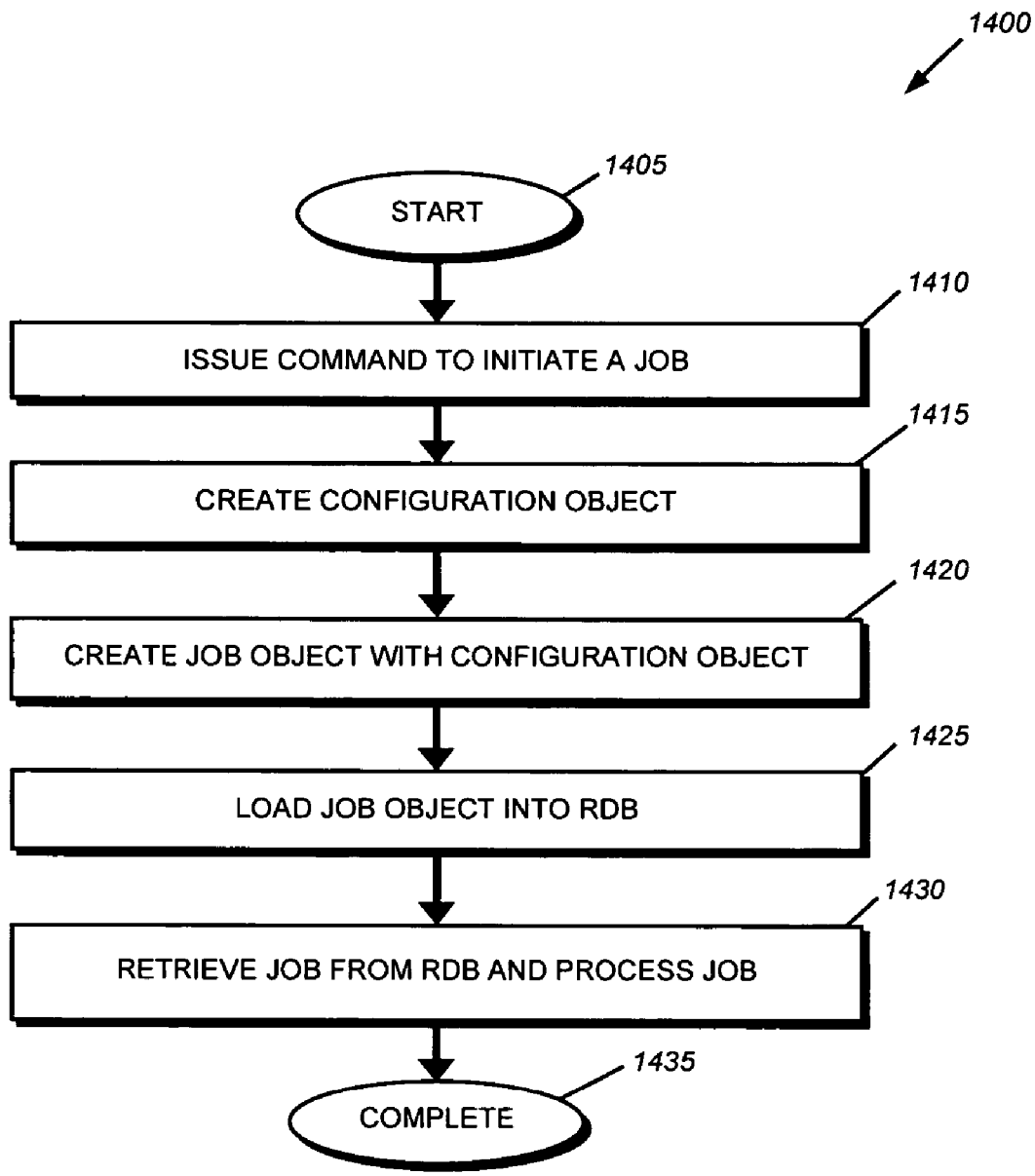
FIG. 14 is a flowchart detailing the steps of a procedure for executing a job in accordance with an embodiment of the present invention.

FIG. 14 is a flowchart detailing the steps of a procedure 1400 for processing a job in accordance with an illustrative embodiment of the present invention. The procedure 1400 begins in step 1405 and continues to step 1410 where a user issues a command to initiate a job. Illustratively, the user enters a command line interface (CLI) command at the administer UI 1170; however, depending upon the user interface associated with a particular storage system, the user may select various options from graphical user interface (GUI) to initiate a job. As such, the description of entering a CLI command should be taken to include the initiation of jobs via a GUI. It should be noted that in alternate embodiments, jobs may be initiated without user intervention by, e.g., automated processes, etc. As such, the description of a user entering a command should be taken as exemplary only.

In response to the execution of the command, the UI process 1175 creates a configuration object 1125 in step 1415. The configuration object 1125 illustratively includes parameters and/or options specified by the user when issuing the command. The JM receives the queued configuration object and creates a job object 1200 utilizing the configuration object 1125 in step 1420. Illustratively, the JM creates the job object 1200 using the configuration object by identifying the appropriate type of job object to be utilized and inserting the configuration object as a configuration class into the job object 1200.

Once a job object 1200 has been created, the JM 1160 then loads the object 1200 onto the J.O. queue 1130 on the RDB in step 1425. By queuing the job object 1200, the JM 1160 causes the RDB to alert all JMs 1160 within the cluster that a newly queued job object is available, i.e. that an update has occurred to the replicated database. In response, each JM 1160 examines the newly queued job object 1200 to determine if it has an affinity for the specific storage system executing the JM 1160 or whether the job object 1200 has a cluster wide affinity. If the job object 1200 has a cluster wide affinity, then any JM 1160 with available processing bandwidth (e.g. available threads of an appropriate priority level) may execute the job object 1200. The appropriate JM 1160 then retrieves the job object 1200 from the Queue 1180 of the RDB and processes the job in step 1430. By retrieving the job from the RDB, the JM alerts the other JMs 1160 within the cluster that it has claimed this job and will process the job to completion. The procedure 1400 then completes in step 1435.

Figure 15:
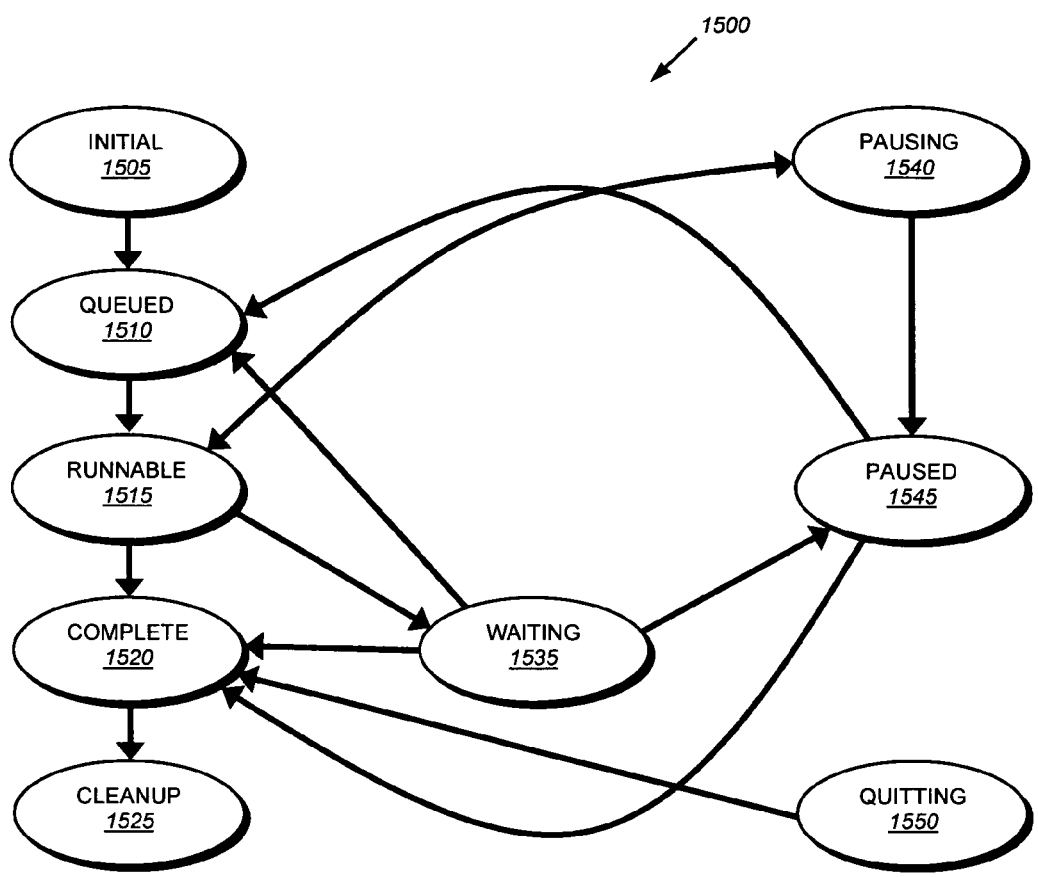
FIG. 15 is a state diagram showing various states of a job in accordance with an embodiment of the present invention.

FIG. 15 is a state diagram 1500 showing various states of a job in accordance with an illustrative embodiment of the present invention. Illustratively, the job begins in an initial state 1505 when its job object 1200 is initially created and then transitions to a queued state (state 1510) when the job object 1200 is loaded onto the job object queue of the RDB. The job transitions to a runnable state 1515 when the JM selects the job for execution from the job object queue. Upon selecting the job, the JM checks the re-queued field within the state data structure 1300 of the job object 1200 to determine whether the re-queued field has been set, thereby indicating that the job object 1200 has been re-queued. If so, the JM calls the Restart( ) function associated with the job object 1200. Note that the job is illustratively responsible for determining the cause of the interruption and cleaning up any temporary data structures before continuing operations as appropriate. However, if the re-queued field is not set, then the JM calls the Run( ) function associated with the job object 1200.

When the Run( ) and/or Restart( ) function completes, a completion value is returned to the JM. Illustratively, these values may have values of JOB_COMPLETE, JOB_WAITING or JOB_PAUSED. The JM examines the returned completion value and takes appropriate action by transitioning the job to a state determined by the returned completion value. For example, if the returned completion value is JOB_COMPLETE, then the job has run to completion and the JM transitions the job to complete state 1520. A JOB_WAITING value denotes that the job wishes to enter into waiting state 1535. Prior to entering the waiting state, the job (JM) registers those jobs that it is interested in waiting for in the jobs waiting on field 1335 of state data structure 1300. If the return value is JOB_PAUSED, signifying that the job responded to an external request to pause, then the job transitions to a pausing state 1540 before entering the paused state 1545. An external action by the JM to quit the job may cause the job to transition from the paused state 1545 to complete state 1520, from which the job transitions to cleanup state 1525 where the job frees any temporarily created data structures, memory and/or files. At this point, the job has been completed and has appropriately cleaned up any temporary data structures. The JM includes appropriate functionality to implement lock mechanisms to prevent jobs from thrashing between states, entering cycles or deadlocks, etc.

Figure 16:
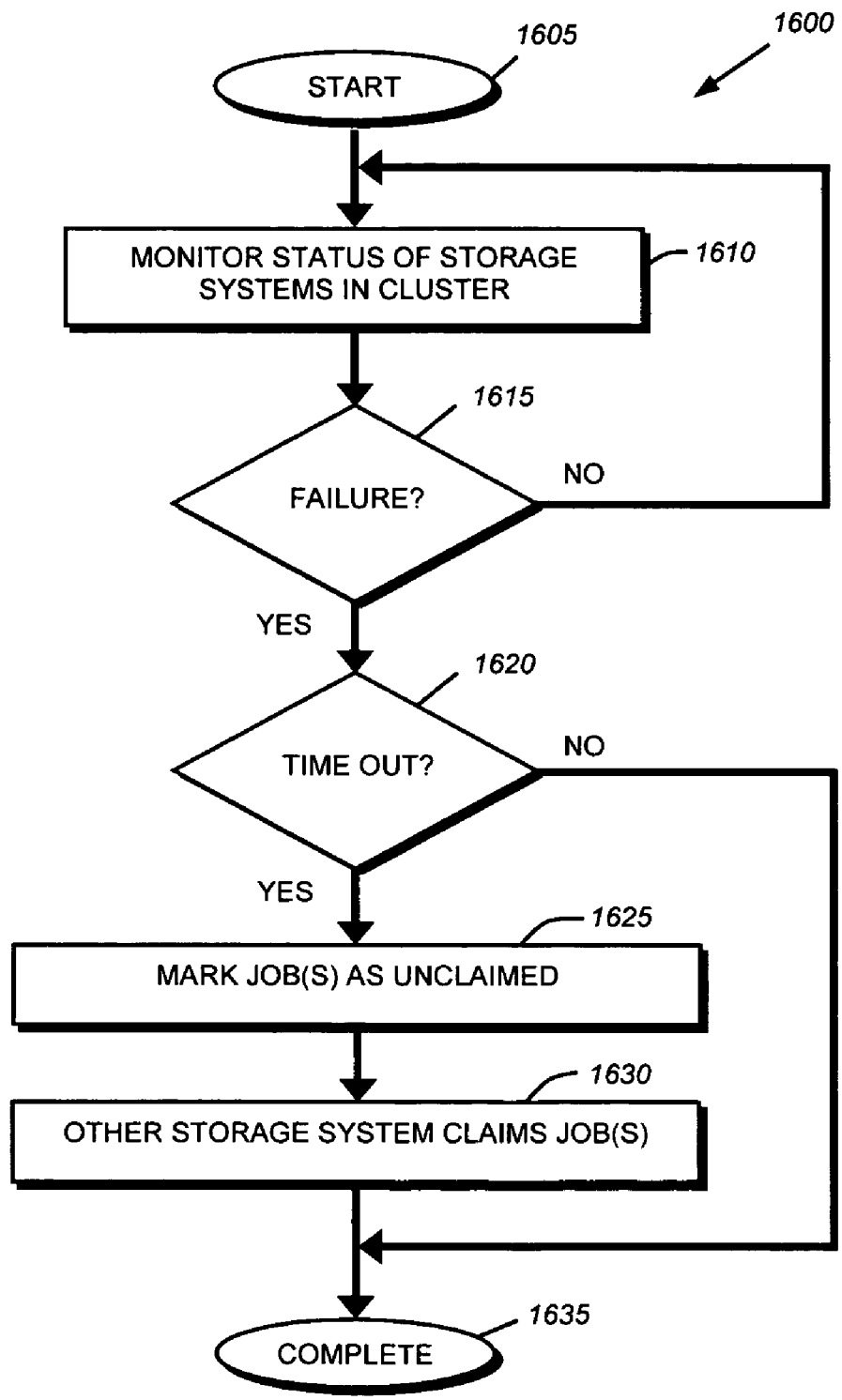
FIG. 16 is a flowchart detailing the steps of a procedure for monitoring and recovering from failures in accordance with an embodiment of the present invention.

FIG. 16 is a flowchart detailing the steps of a procedure 1600 for recovering from failure of one or more storage systems in accordance with an illustrative embodiment of the present invention. The procedure 1600 begins in step 1605 and continues to step 1610 where a master job manager monitors the status the storage systems of the cluster. Illustratively, one of the JMs of the cluster is designated as the master job manager in accordance with an arbitrary scheme. Illustratively, monitoring may be performed by tracking the storage systems currently active within the RDB. However, in alternate embodiments, any technique for monitoring the status of a node in a cluster may be utilized. Illustratively, the monitoring occurs at routine intervals. The master job manager determines whether a failure has occurred in any of the storage systems of the cluster in step 1615. If a failure has not occurred, then the procedure loops back to step 1610, where the master job manager continues to monitor storage system status.

However, if a failure is detected, then the master job manager waits for a predefined timeout period to elapse before taking any action. In step 1620, if the failed storage system recovers within the timeout period, then the procedure loops back to step 1610. Otherwise an error has occurred and the storage system has not recovered within an acceptable period of time. Consequently, the master job manager marks the jobs currently associated with the failed storage system has unclaimed in step 1625. Illustratively, the master job manager sets the re-queued field within the state class of the job object. As a result, when the job object is reclaimed, the JM will call the Restart( ) function instead of the Run( ) function. In response, other storage systems claim the jobs for processing in step 1630. The procedure then completes in step 1635.

To again summarize, the present invention enables JMs to utilize a RDB (or other distributed data store) to enable the management of processes distributed among a plurality of nodes of a cluster and to ensure that jobs execute to completion.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for management of a job, comprising:
   executing, by one or more storage systems of a plurality of storage systems within a storage system cluster, a job manager of a plurality of job managers, at least one storage system within the storage system cluster communicating with another storage system within the storage system cluster via a cluster switch;
   executing, by each storage system within the storage system cluster, a storage operating system to perform storage functions;
   issuing a command to perform the job, the job to be performed by an appropriate job manager of the plurality of job managers;
   creating a configuration object associated with the job;
   utilizing the configuration object to create a job object;
   loading the job object onto a queue of a distributed data store;
   examining, by one or more of each job manager, the job object to determine if a particular storage system executing a particular job manager may process the job object as the appropriate job manager; and
   retrieving, from the distributed data store, in response to the particular storage system executing the particular job manager being able to process the job object, the job object to be processed by the particular job manager.

2. The method of claim 1 further comprising executing a function within the job object.

3. The method of claim 1 wherein the job object comprises of a set of function calls.

4. The method of claim 3 further comprising initializing execution of the job using a run function of the set of function calls.

5. The method of claim 3 further comprising reinitializing execution of the job following requeuing of the job in the distributed data store using a restart function of the set of function calls.

6. The method of claim 1 wherein the job object comprises of a set of data classes.

7. The method of claim 6 wherein the set of data classes comprises a job record containing state information associated with the job.

8. The method of claim 1 wherein retrieving the job object comprises executing the appropriate job manager on one of the storage systems to return the job object from the distributed data store.

9. A system for management of a job, comprising:
a plurality of storage systems organized in a storage system cluster, one or more of the plurality of storage systems configured to execute a job manager;
a cluster switch configured to enable at least one storage system within the storage system cluster to communicate with another storage system within the storage system cluster;
a storage operating system executed by each storage system configured to perform storage functions;
the system configured to receive a command to perform the job;
the system further configured to create a configuration object associated with the job, the system further configured to pass the configuration object to any job manager executed by one of the storage systems within the storage system cluster, the any job manager configured to create a job object using the configuration object, the any job manager further configured to load the created job object onto a queue of a replicated database;
one or more of each job manager configured to determine if a particular storage system executing a particular job manager may process the job object; and
the particular job manager executed by the particular storage system within the storage system cluster configured to retrieve the job object from the replicated database in response to the particular storage system executing the particular job manager being able to process the loaded object, and further configured to process the job object.

10. The system of claim 9 wherein the configuration object is created in response to a user execution of a command.

11. The system of claim 9 wherein the job manager is further configured to load the job object onto a second queue of the replicated database.

12. The system of claim 9 wherein one or more other job managers are configured as the appropriate job manager to retrieve the stored job object from the replicated database and process the job object.

13. The system of claim 9 wherein a first queue is stored in the replicated database.

14. A system for management of a job, comprising:
a processor;
means for executing, by one or more storage systems of a plurality of storage systems within a storage system cluster, a job manager of a plurality of job managers, the job manager configured to be executed by the processor, and at least one storage system within the storage system cluster is configured to communicate with another storage system within the storage system cluster via a cluster switch;
means for executing, by each storage system within the storage system cluster, a storage operating system to perform storage functions;
means for issuing a command to perform the job, the job to be performed by an appropriate job manager of the plurality of job managers;
means for creating a configuration object associated with the job;
means for utilizing the configuration object to create a job object;
means for loading the job object onto a queue of a distributed data store;
means for examining, by one or more of each manager, the job object to determine if a particular storage system executing a particular job manager may process the job object as the appropriate job manager; and
means for retrieving, from the distributed data store, in response to the particular storage system executing the particular job manager being able to process the job object, the job object to be processed by the particular job manager.

15. The system of claim 14 further comprising means for executing a function within the job object.

16. The system of claim 14 wherein the job object comprises of a set of function calls.

17. The system of claim 14 further comprising means for initializing execution of the job using a run function.

18. The system of claim 14 wherein the job object comprises of a set of data classes.

19. The system of claim 18 wherein the set of data classes comprises a state class containing state information associated with the job.

20. A computer readable medium containing executable program instructions executed by a processor, comprising:
program instructions that execute, by one or more storage systems of a plurality of storage systems within a storage system cluster, a job manager of a plurality of job managers, at least one storage system within the storage system cluster configured to communicate with another storage system within the storage system cluster via a cluster switch;
program instructions that execute, by each storage system within the storage system cluster, a storage operating system to perform storage functions;
program instructions that issue a command to perform a job, the job to be performed by an appropriate job manager of the plurality of job managers;
program instructions that create a configuration object associated with the job;
program instructions that utilize the configuration object to create a job object;
program instructions that load the job object onto a queue of a distributed data store;
program instructions that examine, by one or more of each job manager, the job object to determine if a particular storage system executing a particular job manager may process the job object as the appropriate job manager; and
program instructions that retrieve, from the distributed data store, in response to the particular storage system executing the particular job manager being able to process the job object, the job object to be processed by the particular job manager.

21. A method for management of a set of processes within a storage system cluster, comprising:
executing, by one or more storage systems of a plurality of storage systems within a storage system cluster, a job manager of a plurality of job managers, at least one storage system within the storage system cluster configured to communicate with another storage system within the storage system cluster via a cluster switch;
executing, by each storage system within the storage system cluster, a storage operating system to perform storage functions;
issuing a command to perform a job, the job to be performed by one of the job managers of the plurality of job managers;
creating a configuration object associated with the set of processes;

utilizing the configuration object to create an object describing the set of processes;

loading the object onto a queue of a replicated database;

alerting each job manager within the storage system cluster that an update has occurred to the replicated database;

examining, by one or more of each job manager, the object to determine if a particular storage system executing a particular job manager may process the object; and retrieving from the replicated database, in response to the particular storage system executing the job manager being able to process the object, the object by the job manager executed by the particular storage system to initiate execution of the set of processes by the particular job manager.

22. A method for management of a job, comprising:

executing, by one or more storage systems of a plurality of storage system within a storage system cluster, a job manager of a plurality of job managers, at least one storage system within the storage system cluster configured communicate with another storage system within the storage system cluster via a cluster switch;

executing, by each storage system within the storage system cluster, a storage operating system to perform storage functions;

designating one of the job managers as a master job manager;

issuing a command to perform the job, the job to be performed by an appropriate job manager of the plurality of job managers;

creating a configuration object associated with the job;

utilizing the configuration object to create a job object;

loading the job object onto a queue of a distributed data store;

detecting, by the master job manager, a failure of one of the storage systems within the storage system cluster, the appropriate job manager executed on the failed storage system;

waiting for a predefined timeout period to elapse;

marking the job as unclaimed in response to the timeout period elapsing without the failed storage system recovering; and retrieving, from the distributed data store, the job object to be processed by another appropriate job manager executing on another storage system within the storage system cluster.

* * * * *

UNITED STATES PATENT AND TRADEMARK OFFICE
CERTIFICATE OF CORRECTION

PATENT NO. : 7,840,969 B2  
APPLICATION NO. : 11/414696  
DATED : November 23, 2010  
INVENTOR(S) : Comer Page 1 of 1

It is certified that error appears in the above-identified patent and that said Letters Patent is hereby corrected as shown below:

In the Claims:  
Claim 2, col. 20, line 53 should read:  
function within the retrieved job object.

Claim 12, col. 21, lines 41-43 should read:  
managers are further configured as an appropriate job manager to  
retrieve a stored job object from the replicated database and  
process the retrieved job object.

Claim 14, col. 22, line 1 should read:  
means for examining, by one or more of each job manager, the Claim 15, col. 22, line 11 should read:  
executing a function within the retrieved job object.

Claim 21, col. 23, line 6 should read:  
examining, by one or more of each job manager, the job object Claim 21, col. 23, line 8 should read:  
particular job manager may process the job object; and Claim 21, col. 23, line 11 should read:  
being able to process the job object, the job object by the job Signed and Sealed this  
Fourth Day of February, 2014

Michelle K. Lee  
*Deputy Director of the United States Patent and Trademark Office*